United States Patent [19]

Biller et al.

[11] Patent Number: 4,564,044

[45] Date of Patent: Jan. 14, 1986

[54] ROTATABLE VALVE ASSEMBLY

[75] Inventors: Victor Biller, Penfield, N.Y.; Adelmar Faessler, Hendersonville, N.C.

[73] Assignee: Figgie International Inc., Willoughby, Ohio

[21] Appl. No.: 588,861

[22] Filed: Mar. 12, 1984

[51] Int. Cl.⁴ ...................... F16K 11/085; F16K 25/00

[52] U.S. Cl. .......................... 137/625.24; 137/625.22; 137/375; 137/315; 251/310; 251/356; 251/309

[58] Field of Search ...................... 137/625.22, 625.24, 137/329, 329.01, 329.04, 375, 315; 251/309, 310, 316, 356, 311, 312, 313

[56] References Cited

U.S. PATENT DOCUMENTS

| | | | |
|---|---|---|---|
| 660,101 | 10/1900 | Goodlett | 137/625.22 |
| 948,075 | 2/1910 | Richard | 251/309 |
| 3,093,359 | 6/1963 | Woody | 251/314 |
| 3,771,765 | 11/1973 | Scapes | 251/310 |
| 4,113,228 | 9/1978 | Frye | 251/309 |
| 4,244,404 | 1/1981 | Brockner et al. | 141/146 |

*Primary Examiner*—Martin P. Schwadron
*Assistant Examiner*—John S. Starsiak, Jr.
*Attorney, Agent, or Firm*—Christel, Bean & Linihan

[57] ABSTRACT

A rotatable valve assembly (38) for a rotary piston filling machine, the rotatable valve assembly being received within a valve body (30). The valve assembly includes a supporting valve plug (40) and interchangeable valve sleeves (42) which are adapted to be telescoped over the valve plug to an assembled position. Alignment means in the form of pins (152) and apertures (154) maintain the sleeve (42) in its desired assembled relationship on the plug (40) and insures that the valve sleeve (42) will rotate with the valve plug (40). The parts can be readily disassembled for cleaning. The valve sleeve (42) may be formed of polytetrafluoroethylene or of Waukesha Metal. The valve plug is preferably made of a stainless steel suitable for use in the food industry.

7 Claims, 10 Drawing Figures

124
122
152
152
146
40d
40
142
140
144
40f
154
148
154
42d
42
42f 133
134
132

102
108
106
8
8
134
132
47
47
64

ROTATABLE VALVE ASSEMBLY

TECHNICAL FIELD

The present invention relates generally to filling machines which are capable of filling a container with fluent material, and more particularly to an improved machine of the type generally referred to as rotary piston fillers.

BACKGROUND OF THE INVENTION

Rotary piston filling machines are well known in the art and a typical example is shown in U.S. Pat. No. 2,958,346, the subject matter of which is incorporated herein by reference thereto. Such machines are provided with a central product reservoir, the lower end of which has a plurality of radially outwardly extending ports. The reservoir and ports are adapted to be rotated about a central vertically extending axis and within a stationary cam framework. Associated with each port is a product filling station which includes a valve body having a rotatable valve disposed therein, a cylinder and piston assembly mounted thereon, and a container support. Each product station is rotated with the central hopper and its operation is controlled by the stationary cams. After a container to be filled has been loaded onto the machine, the piston is normally in its lowermost position and the rotatable valve is in its fill position. As the container and filling station are rotated with the central reservoir the piston will be moved upwardly by a cam causing a precise quantity of fluent material to be drawn within the cylinder. After the cylinder has been filled with the desired quantity of material the piston is held stationary while another cam causes the valve to rotate from a fill position to a discharge position. Next the piston is moved downwardly to discharge the fluent material within the cylinder into a container disposed below the valve body. Finally, the valve is rotated again to its fill position, and after this step has been completed the container is discharged from the filling machine.

Because of different types of materials which may be filled into containers two differing forms of rotatable valves are in common use today. The first form utilizes a rotatable valve plug formed of a non-galling nickel alloy of the type shown in U.S. Pat. No. 2,743,176 and sold under the name of Waukesha Metal. This alloy is, to date, the only existing corrosion resistant non-galling alloy which is in common use in the food industry where there is metal to metal contact with stainless steel. Rotatable valves of this alloy are utilized where the product to be filled into the container has good lubricating qualities, such as for example a vegetable oil, or products containing such oils. Valves made of Waukesha Metal are not suitable for products which have poor lubricity, such as, for example, tomato paste. Thus, it has been known in the industry to provide a second form of valve for such products. This form of valve includes a stainless steel valve plug to which a corrosion resistant inert and non-galling sleeve has been sealed on, such as for example polytetrafluoroethylene. The form of valve which has material sealed thereon has poor abrasion resistant qualities, and in addition such devices have been criticized as it is possible for the seal to open along the interface between the sleeve material and the supporting stainless steel permitting the intrusion of products which must be cleaned out in order to meet health standards. In order to fill a wide variety of products, it will be necessary to stock both rotatable valves made of Waukesha Metal as well as valves provided with a bonded sleeve. This obviously increases the cost of the machine.

OBJECTS AND SUMMARY OF THE INVENTION

It is an object of the present invention to provide a rotatable valve assembly which overcomes the disadvantages of the prior art.

More specifically, it is an object of the present invention to provide a rotatable valve assembly of relatively low cost which can be utilized with a wide variety of products and which can also be readily cleaned and sterilized.

The above object and other objects and advantages of this invention are accomplished by providing a stainless steel valve plug as well as valve sleeves which may be slipped upon the valve plug and held non-rotatably thereon during the operation of the machine. One form of sleeve is preferably polytetrafluoroethylene which can be removed and easily cleaned and sterilized. Another form of sleeve is of Waukesha Metal and by using a support member of stainless steel the overall cost of the Waukesha Metal rotatable valve assembly is reduced. The sleeve and plug are non-rotatably held in alignment with respect to each other by unequally radially spaced apart pins which are carried by a flange on the valve plug, the free ends of the pins being received by apertures in a corresponding flange on the valve sleeve.

Additional objects and advantages of this invention will become more apparent to those skilled in the art after a consideration of the following detailed description taken in conjunction with the accompanying drawings in which a preferred form this invention is illustrated.

DETAILED DESCRIPTION

Figure 1:
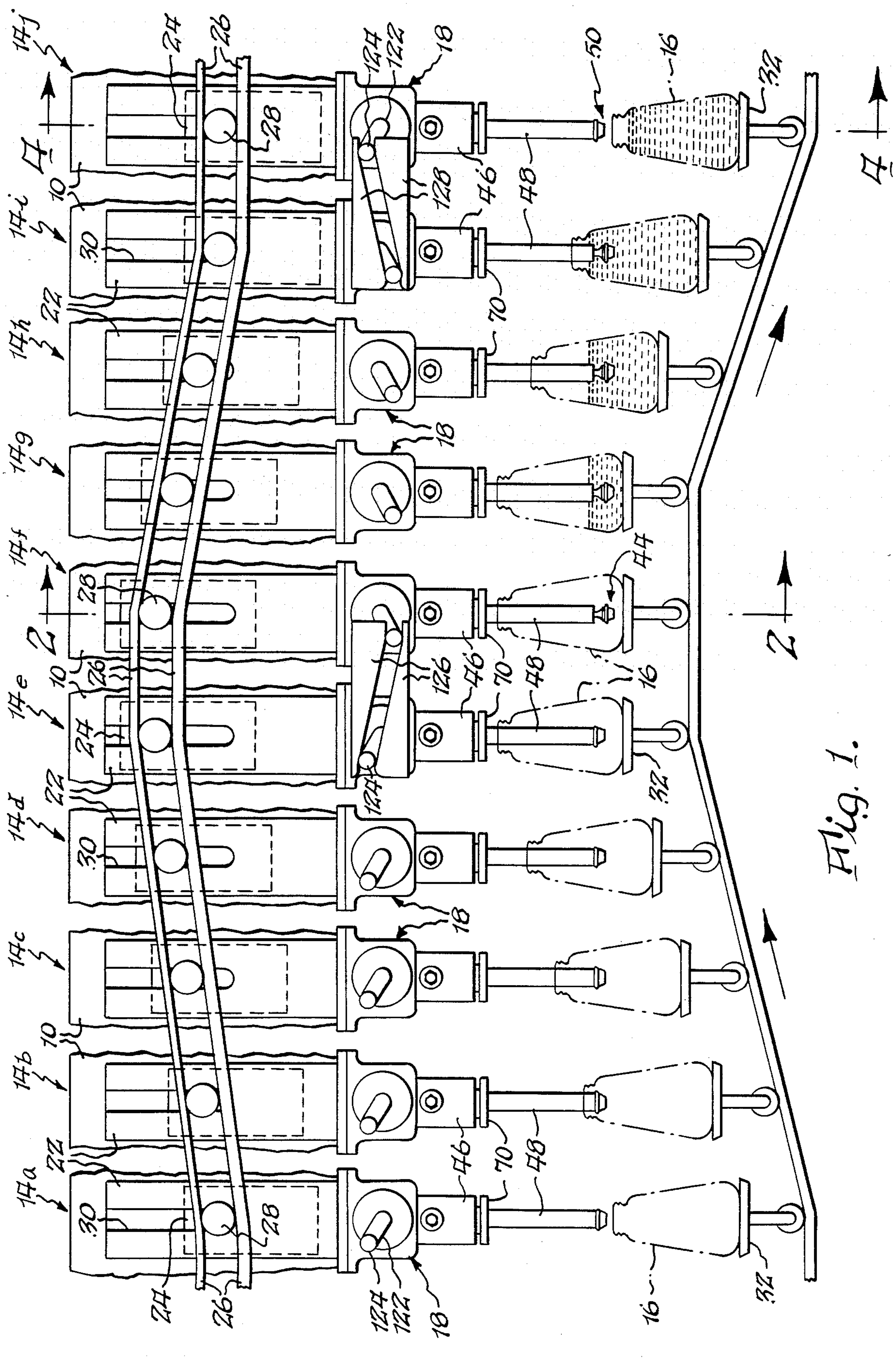
FIG. 1 is a schematic developed view of a rotary piston filling apparatus constructed in accordance with the principles of this invention.

The filling apparatus with which the present invention is adapted to be utilized is of the type customarily referred to as a rotary piston filler. Such a filling machine includes a rotatable central reservoir 10 rotatable about a generally vertically extending axis, the reservoir 10 being provided with a plurality of radially spaced apart peripheral cylindrical reservoir ports 12 in the base thereof. A plurality of filling stations, indicated generally at 14, are associated with the ports 12, there being one filling station 14 mounted on the periphery of the reservoir adjacent each port 12. The stations 14 are caused to be rotated with the reservoir 10 during the filling operation of containers 16.

Each filling station 14 includes a valve body 18 which receives a rotary valve assembly 20, an upwardly extending cylinder 22 secured to the valve body 18, and a piston 24 which is movable within the cylinder 22. The operation of the piston 24 is controlled by a fixed piston control cam assembly 26 which extends about the periphery of the rotary piston filling apparatus and which does not rotate with the reservoir 10. Thus, each piston 24 is associated with a cam follower 28 rotatably mounted on a stub shaft (not shown) carried by the piston 24 and which projects through an associated vertically extending slot 30 in the associated cylinder 22. In addition, each station also includes a container support 32.

Reference will now be made to FIG. 1 in which ten filling stations are illustrated. However, it should be appreciated that a typical rotary piston filling apparatus will probably have many more stations than those illustrated in this figure, and also that additional stations need be present for the loading and unloading of the containers 16, which stations are not illustrated in FIG. 1. In FIG. 1 the various filling stations are sequentially identified as filling stations 14*a* through 14*j*. It can be appreciated from an inspection of FIG. 1 that as the reservoir 10 and stations 14 rotate about the vertically extending axis, that the pistons 24 will be moved from their lowermost position, illustrated at station 14*a*, to a fully raised position, illustrated at station 14*e*, and then back to a fully lowered position illustrated at 14*i*.

Each valve body 18 has a cylindrical bore 34 therein, and each valve body 18 is removably secured to the central reservoir 10 in such a manner that each cylindrical bore 34 within the valve body 18 is aligned with an associated reservoir port 12. As can be seen from FIGS. 2 and 4 each valve body is provided with three valve ports. A first valve port 36 is disposed near the central reservoir 10 and serves as a fill port. Spaced outwardly of the fill port 36 are a pair of opposed upper and lower discharge ports 38.

Figures 2, 3:
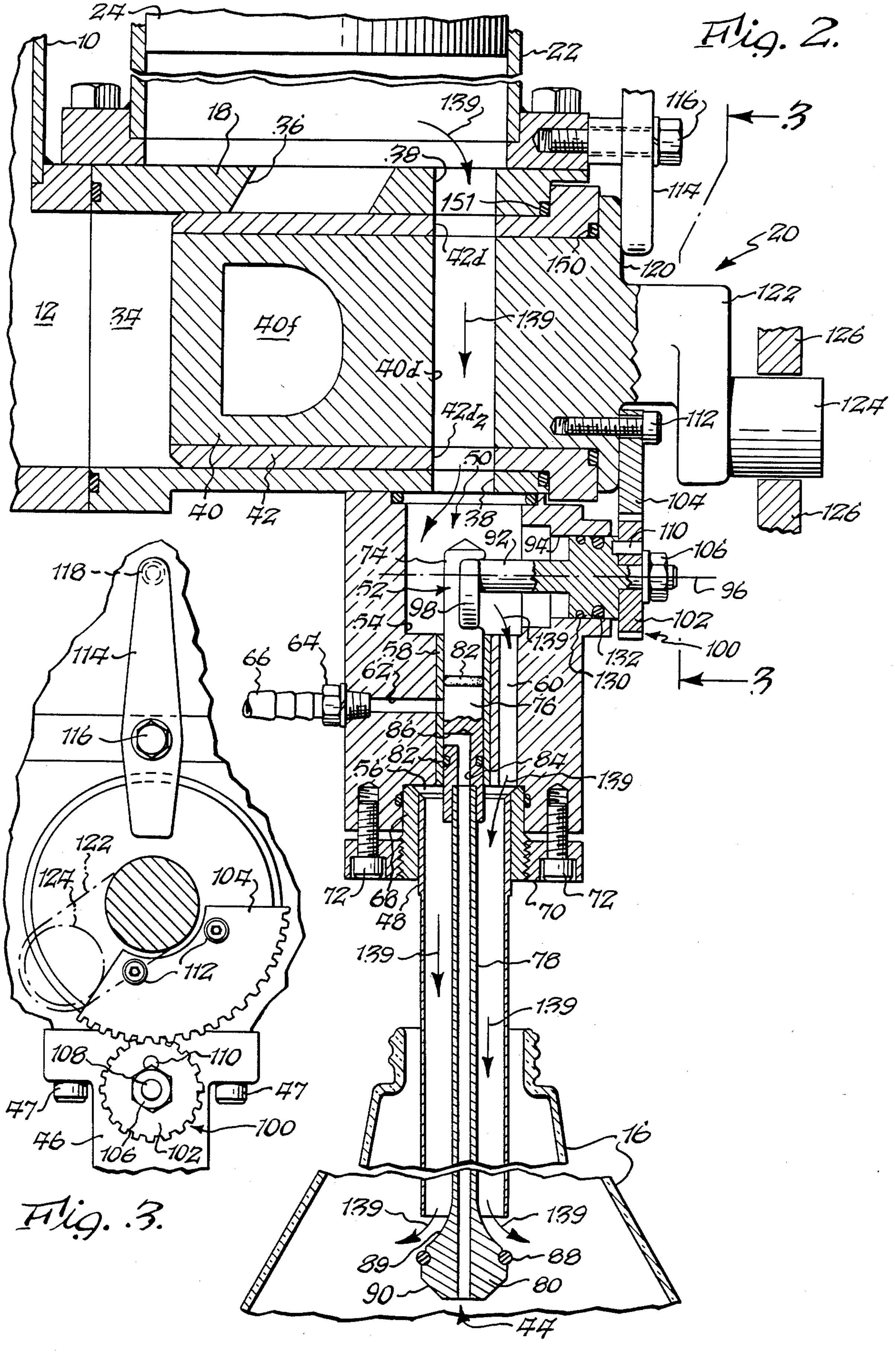
FIG. 2 is a partial section taken generally along the line 2—2 in FIG. 1 showing the various parts of a container filling station in a position where fluent material is being discharged into a container.
FIG. 3 is a section taken generally along the line 3—3 in FIG. 2, parts being shown in phantom.
Figures 4, 5:
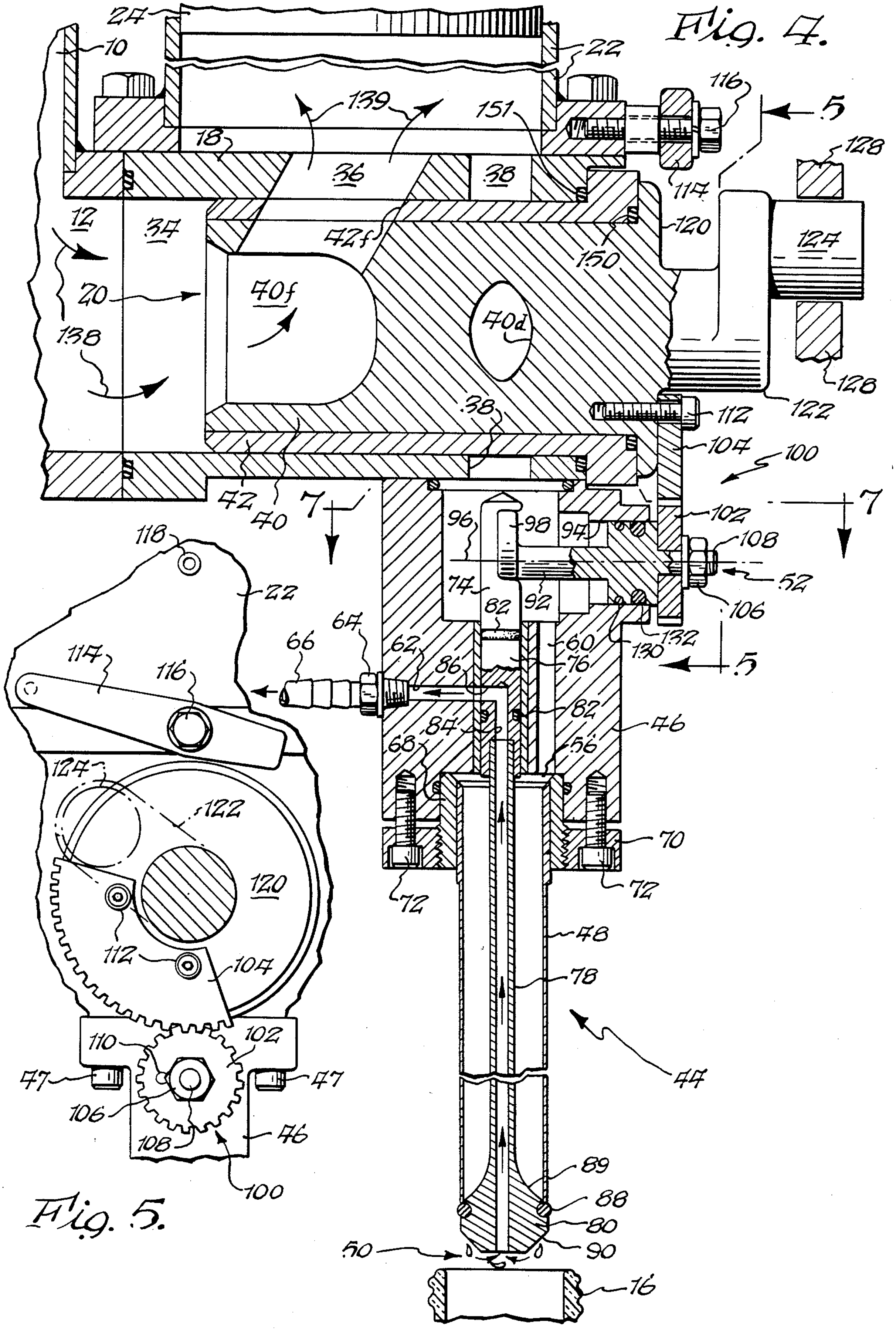
FIG. 4 is a partial section taken generally along the line 4—4 in FIG. 1 showing the various parts of a container filling station in the position they assume when the cylinder associated with a filling station is being filled and no material is being discharged to a container.
FIG. 5 is a section taken generally along the line 5—5 in FIG. 4.
Figures 6, 7, 8:
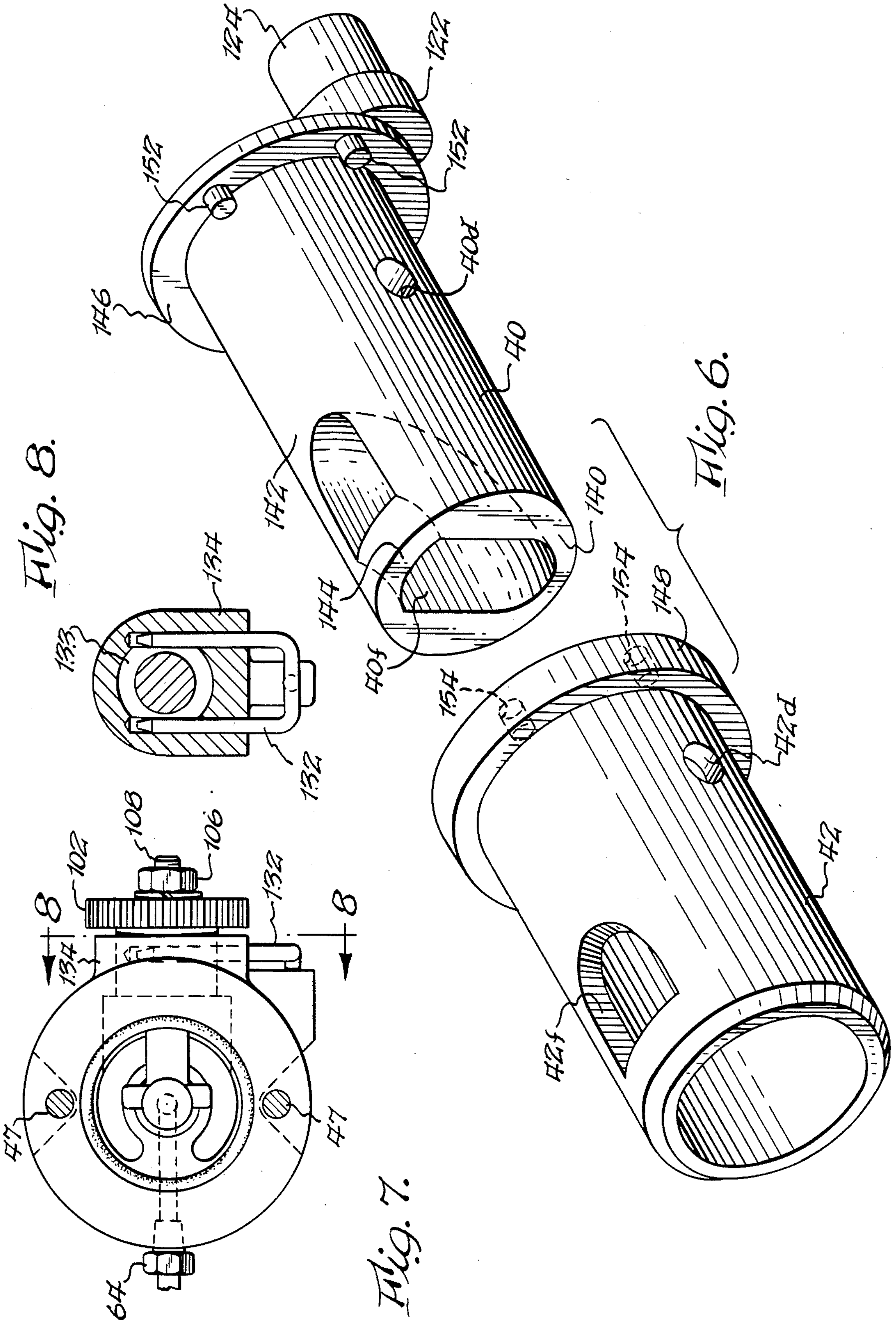
FIG. 6 is an exploded perspective view of a rotary valve assembly for a filling apparatus of the type described.
FIG. 7 is a section taken generally along the line 7—7 in FIG. 4.
FIG. 8 is a view taken generally along the line 8—8 in FIG. 7.

The rotary valve assembly 20 is disposed within the cylindrical bore 34, and is movable from a first or fill position, illustrated in FIG. 4, to a second or discharge position illustrated in FIG. 2. The rotary valve assembly can include a solid plug 40 which supports a sleeve 42 for rotation therewith. The plug and sleeve 42 are each provided with fill and discharge ports, these being indicated at 40*f*, 42*f*, and 40*d* and 42*d*, respectively.

Removably mounted below the valve body 18 is a nozzle assembly indicated generally at 44. The nozzle assembly includes a nozzle body 46 which is removably secured to the valve body 18 by bolts 47. The nozzle assembly also includes a fixed filling tube 48 which is removably interconnected to the nozzle body 46, and a removable tube assembly, indicated generally at 50, which is coaxially mounted within the fixed filling tube 48 and is shiftable between upper and lower positions. Finally, the nozzle assembly additionally includes movable cam means indicated generally at 52.

Referring now in greater detail to the nozzle body 46, it can be seen that this body is provided with upper and lower concentric cylindrical bores 54 and 56. Disposed between the bores 54 and 56 is another cylindrical bore which receives a sleeve 58. Disposed about the sleeve 58 is a C shaped passageway 60 which serves to interconnect the bores 54 and 56. The bores 54 and 56, as well as the C shaped passageway 60, function as a generally vertically extending fluent material passageway. Finally, the nozzle body is provided with a fixed suction passageway 62 transverse to the sleeve 58, the passageway extending to the sleeve and the sleeve having a corresponding aperture (no number) in communication with the passageway. A barbed fitting 64 may be secured to the nozzle body 46 about the suction passageway 62, the barbed fitting in turn receiving a vacuum line 66.

The upper end of the fixed filling tube 48 is telescopically received within a cylindrical member 68 which is threaded at its lower exterior portion. The member 68 is in turn threaded into a threaded aperture in a mounting plate 70 which is secured to the base of the nozzle body 46 by cap screws 72. It can be seen from FIGS. 2 and 4 that when the parts are in their assembled position that the interior of the vertically extending filling tube is in communication with the bore 56 so that material which passes through the bore 54, C shaped passageway 60, and bore 56 can be introduced into the tube 48.

The movable tube assembly 50 consists essentially of four parts which are a cam follower portion 74, a spool portion 76, an elongated tube 78, and a sealing foot 80. The cam follower portion and spool portion are integral with each other, and the elongated tube and sealing foot are, as illustrated, integral with each other. The spool portion 78 is slidably received within the sleeve 58 much in the same manner that a valve spool is received within its associated valve body. To this end, the spool portion is provided with annular recesses which receive O-rings 82. The spool portion is additionally provided with a coaxial bore or passageway 84 which extends from the bottom of the spool portion to an intermediate location disposed between the two O-rings. A right angle passageway 86 is interconnected with the coaxial passageway 84 and extends to the surface of the spool. The cam follower portion is provided with a slot which serves as a cam follower and receives a cam. The upper end of the elongated tube 78 is received within an enlarged lower portion of the passageway 84 and is secured thereto in a conventional manner. The sealing foot 80 includes an enlarged diameter portion of a width approximately equal to the width of the fixed tube 48, the enlarged portion receiving an O-ring 88 which may be placed in sealing engagement against the lower surface of the fixed tube 48. The surface 89 above the O-ring 88 is disposed at an angle to guide the fixed tube 48 into the ring 88 when the foot is moved from the position shown in FIG. 2 to the position shown in FIG. 4. In addition, the sealing foot 80 is provided with a downwardly extending conical portion 90. The bore which extends through the elongated tube 78 also extends through the sealing foot 80 and terminates centrally of the external surface of the downwardly extending conical portion 90.

The movable cam means 52 includes a rotatable element 92 which is rotatably journaled within a transversely extending cylindrical bore 94 formed in the nozzle body 46. It should be noted that the axis 96 of the rotatable element 92 passes through the slot or cam follower in cam follower portion 74. A cam 98 is secured to one end of the rotatable element 92 and is disposed within the cam follower.

Gearing means 100 are provided which are capable of causing the rotatable element 92 to rotate in response to the operation of the filling apparatus, and more specifically, in response to the movement of the rotary valve assembly 20. The gearing means includes a first gear 102 connected to the other end of the rotatable element 92, and a second gear, or more specifically gear segment, which is connected to the rotary valve assembly 20. In this connection, it should be noted that the first gear 102 is secured in place by a nut 106 which passes over the threaded end 108 of the rotatable element 92, the first gear being held from rotation by means of a pin 110. The gear segment 104 is held in place by cap screws 112. As can be seen from FIGS. 3 and 5 the gears are in meshing relationship with each other.

The valve assembly 20 is held in place by a valve lock in the form of a pivoted bar 114, an intermediate portion of the bar 114 being pivotally supported by a bolt 116. The end of the bar 114 remote from the rotary valve assembly 38 is provided with a suitable surface which can be engaged by a valve lock detent 118 as shown in FIG. 3. When in this position the other end of the bar 114 bears against an end surface 120 of the valve plug 40. The bearing surface of the bar 114 may be provided with a suitable wear pad, not shown. In FIG. 5 the bar is shown in that position which it would assume if the valve assembly were to be withdrawn from the valve body 18.

A crank arm 122 extends outwardly of the surface 120 on the valve plug 40 and a cam follower 124 is journaled thereon. The cam follower 124 can engage suitable cams 126 and 128 to shift the valve assembly 20 from the fill position to the discharge position as a filling station 14 is moved from position 14*e* to 14*f*, and subsequently the cam follower 124 is engaged by cam 128 as the station moves from position 14*i* to 14*j* to shift the valve from the discharge position to the fill position.

The rotary element 92 is provided with a sealing O-ring 130, and the element 92 is held in its assembled position by a C-clip 132 which passes through an annular groove 133 in the rotatable element 92 and suitable apertures in a boss 134 which is a portion of the nozzle body 46.

The apparatus described operates in the following manner: Empty containers 16 are presented to the rotary piston filler machine and filled containers are removed therefrom. These steps are not illustrated in the accompanying drawings as they are well known in the art and can be seen, for example, in U.S. Pat. No. 2,958,346. The container is received on support 32 and is supported by the support from the time the container enters the rotary piston filling apparatus until it is discharged therefrom. It can be seen from an inspection of station 14*a* that initially the top of the container is disposed below the bottom of the fixed filling tube 48, as well as the bottom of the movable tube assembly 50. In order to reduce foaming it is desirable that the fluent material to be filled into the container be introduced below the surface of the fluent material already within the container. To this end, the container is moved upwardly with respect to the fixed filling tube 48 until it attains the position illustrated at station 14*e*. In the meantime the piston 24 is being moved upwardly within the cylinder 22 by the action of the cam 26 to introduce a predetermined amount of fluent material within the cylinder 22 below the piston 24. In this connection, it should be noted that while the piston is being moved in an upward direction by the action of the cam 26 that the valve assembly 20 is in the position illustrated in FIG. 4 permitting fluent material to move in the direction indicated by the arrows 138. After the container and associated piston have been rotated to the position indicated at 14*e* there is a dwell portion on the cam 26 between positions 14*e* and 14*f*. While the piston is in its upper dwell position the valve cam follower 124 is engaged by the cam 126 to cause the valve 20 to rotate from its fill position indicated in FIG. 4 to its discharge position indicated in FIG. 2. As the valve 20 is being rotated the movable cam means 52 and the gearing means 100 act to interconnect the rotary valve assembly 20 and the movable tube assembly 50 in such a manner as to cause the movable tube assembly to be moved to its lowered position, shown in FIG. 2, when the rotary valve assembly is moved to its discharge position. (By the same token it should be noted that the cam means 52 and gearing means 100 will also cause the movable tube assembly 50 to be disposed in its raised position when the rotary valve assembly 20 is moved back to its fill position.) After the valve 20 has been moved to its discharge position at station 14*f*, the cam 26 will then cause the piston 24 to move downwardly discharging sufficient fluid from the cylinder 22, through the valve assembly, and through the fixed tube 48, all being indicated by arrows 139, to initially cover the lower end of the fixed filling tube 48, as illustrated at 14*g*. Subsequent movement of the piston downwardly will also be accompanied by downward movement of the support 32, the movement of the piston and support preferably being coordinated in such a manner that the lower end of the filling tube is always maintained a slight distance below the surface of the fluent material within the container as it is being filled. After all of the prescribed quantity of material within the cylinder 22 has been discharged into the container 16 the cam 26 enters into another dwell position at which time the cam follower 124 on the end of the valve plug 40 is engaged by cam 128 to shift the valve back to its fill position. At this time the movable tube 78 will be shifted from its open position shown in FIG. 2 to its closed position illustrated in FIG. 4 which will prevent any further material within the fixed filling tube 48 from being discharged into the container 16. This will also place the bore within the elongated tube 78 and passageways 84, 86 in communication with the suction passageway 62 and vacuum line 66. This will insure that any droplets of fluent material which may be on the conical surface 90 will not drip onto the container 16, but will instead be withdrawn through the bore of tube 78, passageways 84, 86, suction passageway 62, and vacuum line 66, thus preventing marring of the containers by droplets of the material which may fall from the filling apparatus. It should be observed that when the movable tube assembly is in its lower position as illustrated in FIG. 2 that the bore within the tube 78 is not in communication with the suction passageway and thus material is not drawn into the vacuum line. This will insure that a relatively precise quantity of material is discharged within the container 16 and will also prevent waste of such material.

The rotatable valve assembly 20 includes essentially three elements, namely a substantially solid valve plug 40, the generally cylindrical valve sleeve 42, and alignment means which extend between the valve plug and the sleeve to hold the parts in their desired assembled relationship, the alignment means permitting disassembly of the parts but also causing the valve sleeve to rotate when the valve plug is rotated. The solid valve plug is provided with the filling port 40*f* which extends from the end face 140 of the plug to the cylindrical surface 142, there being a bridge of supporting material 144 between the opening in the end face 140 and the opening in the cylindrical surface 142. The plug is additionally provided with a transverse bore 40*d* and a flange 146 at the end opposite from the end face 140.

The generally cylindrical rotary valve sleeve 42 is provided with a first opening 42*f* which generally corresponds to the opening for the fill port 42*f* in the cylindrical surface 42. Similarly, the sleeve is provided with discharge ports 42*d* alignable with the discharge port 40*d* in the plug. Finally, the sleeve is provided with a flange 148 at that end remote from the fill port. As can be seen from FIGS. 2 and 4 a groove is formed in the flanged portion for the reception of a seal in the form of an O-ring 150 and a groove is formed in the valve body 18 for the reception of another seal in the form of an O-ring 151. The sleeve 42 and plug 40 can be assembled by merely telescoping the sleeve over the plug. To insure that the parts are in their proper aligned position unequally spaced apart pins 152 are supported by the flange 146 and are adapted to engage corresponding blind apertures 154 in flange 148 of sleeve 42. By making the apertures blind, contamination past the O-rings 150 and 151 is prevented.

By employing the construction described above, it is possible to handle differing forms of fluent materials without the necessity of providing entirely different valves. Thus, in the past, when handling fluent materials of poor lubricity, such as for example tomato paste, it has been necessary to provide a valve plug on which a coating of polytetrafluoroethylene has been bonded. As there is a seam between the bonded polytetrafluoroethylene and the supporting plug, this form of valve has not been desirable because of the difficulty of thoroughly cleaning it. The problems occurring with this form of valve have been overcome by merely making the sleeve removable whereby cleaning can be facilitated. In addition, by making the plug of an ordinary stainless steel it is also possible to provide an approved sleeve for abrasive materials, which sleeve could be of an alloy of the type shown in U.S. Pat. No. 2,743,176, thus eliminating the necessity of providing a solid rotatable valve of such material, which is relatively expensive. Thus, by providing a substrate plug and sleeves suitable for different applications it is possible to both materially reduce the costs of the valve assemblies and to improve the ability to properly clean the various components.

It can be seen from an inspection of the various drawings that the parts of the apparatus can be readily disassembled for cleaning purposes.

Figure 9:
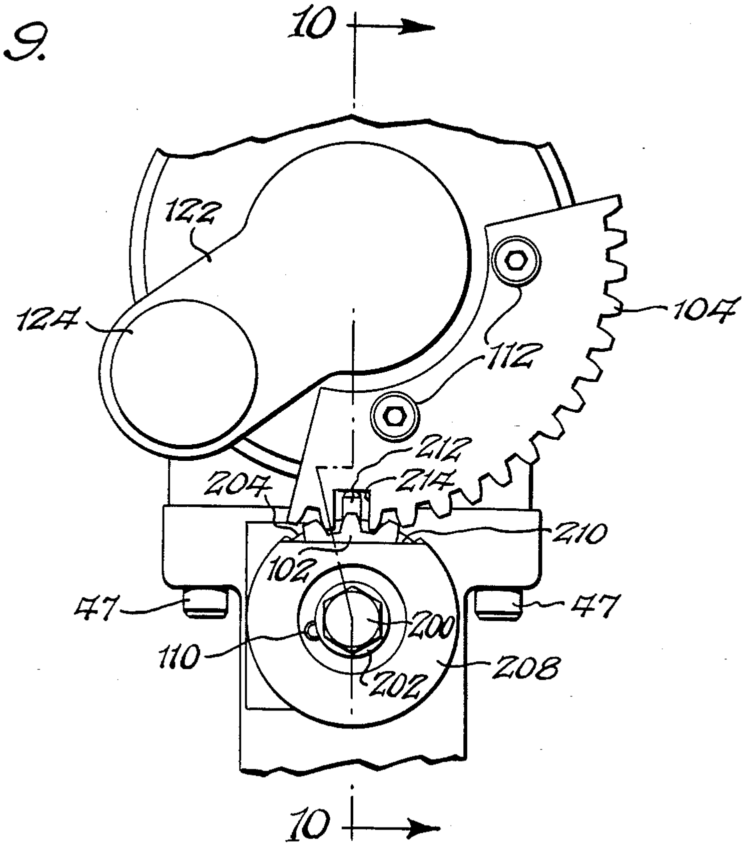
FIG. 9 is a view similar to FIG. 3 but showing a modified structure.
Figure 10:
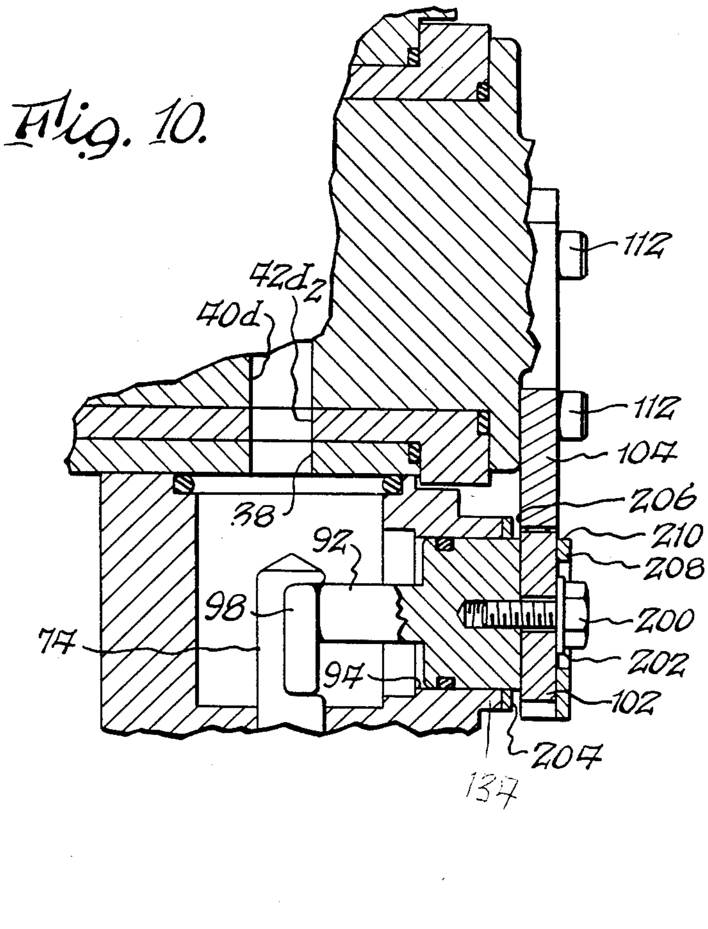
FIG. 10 is a view taken generally along the line 10—10 in FIG. 9.

Referring now to FIGS. 9 and 10 a slightly modified structure is illustrated which eliminates the retaining C-clip 132. With the structure employing the C-clip it has been found that it is possible to reassemble the parts so that they are not in synchronization with each other as, for example, by rotating and reassembling the rotatable element 92 without corresponding rotational movement of the rotary valve assembly. In the design illustrated in FIGS. 9 and 10, the groove 133 in the rotatable element 92 which receives the C-clip is eliminated along with the corresponding apertures in the boss 134. Additionally, the gear 102 is held in place by a bolt 200 and washer 202, the bolt passing through an aperture in the gear 102 and being received within a threaded aperture in the rotatable element 92. The gear 102 is pinned by means of a pin 110 to prevent it from rotating with respect to the rotatable element 92. The rotatable element 92 is also provided with a flanged element 204, which may be integral with the rotatable element 92, or which may be formed separately, mounted over the end of the rotatable element, and rigidly secured thereto. The flanged element 204 will be captured between the boss 134 and the inner surface 206 of the gear or rack 104, and thus is not necessary to provide any other structure to retain the rotatable elements 92 in its place.

To facilitate the assembly of the gear segment 104 and the driven gear in their proper assembled relationship, an alignment washer 208 is secured to the outer or right hand surface (FIG. 10) of the gear 102, the washer 208 having a diameter equal to the full diameter of the driven gear 102 except for a chordal portion which has been removed along line 210. The gear 102 is also provided with an outwardly extending pin 212 which can be received within a cutout 214 in the rack 104.

To assemble the parts in their proper assembled relationship after the rotary filling machine has been cleaned, the rotatable element 92 is first inserted into the bore 94 with the cam 98 being captured by the cam follower within the cam follower portion 74. Before the rotary valve assembly can be reassembled within the valve body it will be necessary that the movable tube assembly be in its fully lowered position as illustrated in FIG. 2. When the parts are in this position the chord 210 of alignment washer 208 will be spaced above bolt 200 and lie in a generally horizontal position, this being illustrated in FIG. 9. The pin 212 will then be projecting upwardly towards the axis 96. Now the rotatable valve assembly 20 can be installed. It should be observed that it cannot be installed except when the rotatable element is in the position illustrated in FIG. 9 as the rack cannot pass over the right hand surface of the alignment washer and can only pass above the cutout portion. When the rotatable valve assembly is assembled the pin 212 will be received within the cutout 214 of the rack 104 to insure that the parts are in their desired assembled relationship.

After the rotatable valve assembly has been installed it will be secured in place by the valve lock or pivoted bar 114 thus insuring that the parts will be maintained in their desired assembled relationship. To disassemble the parts it is only necessary to swing the valve bar to the position illustrated in FIG. 5. At this point both the rotatable element 92 and the rotatable valve assembly can be pulled as a single unit, or, if they are in the position illustrated in FIG. 9, the rotatable valve assembly 20 can be pulled first and then the rotatable element 92 can be pulled. However, to reassemble the parts it is desirable that the procedure outlined above be followed to insure that the parts are still maintained in their desired assembled relationship.

While a preferred form in which the principles of the present invention have been illustrated and described above, it is to be understood that this invention is not to be limited to the particular details shown and described above, but that, in fact, widely differing means may be employed in the broader aspects of this invention.

What is claimed is:

1. A rotatable valve assembly for an apparatus of the character described, and capable of being received within a valve body having a cylindrical valve bore therein, said rotary valve assembly comprising:

a substantially solid valve plug provided with a suction inlet at one end, a radially outwardly extending flange at the other end, a main body portion which extends from said one end to said flange, said portion having a cylindrical surface, and an intermediate discharge port in said main body portion and intersecting said cylindrical surface at a pair of opposed locations, said suction inlet also intersecting said cylindrical surface at another location;

a generally cylindrical rotary valve sleeve, the diameter of the inner cylindrical surface of the sleeve being approximately the same as the diameter of the cylindrical surface of the main body portion of the valve plug, and the outer cylindrical surface of the sleeve being approximately the same diameter as the cylindrical bore of the valve body so that the valve sleeve may be telescopically received therein, said valve sleeve being provided with a first opening and a pair of opposed second openings, all of said openings capable of being simultaneously aligned with the suction inlet and the discharge port in the valve plug, respectively;

alignment means extending between a radially outwardly extending surface of said flange adjacent the cylindrical surface on said valve plug and one end of the sleeve to hold the parts in their desired assembled relationship but permitting disassembly of the parts, said alignment means causing the valve sleeve to rotate when the valve plug is rotated; and seal means between said cylindrical surfaces to insure that there is no contamination past the seal means.

2. The rotatable valve assembly as set forth in claim 1 wherein the alignment means are unequally spaced apart pins supported by said flange and corresponding apertures in said valve sleeve which receive said pins when the parts are assembled.

3. The rotatable valve assembly as set forth in claim 2 wherein said valve sleeve is provided with a flange at one end, said apertures being provided within said flange.

4. The rotatable valve assembly as set forth in claim 1 wherein the valve plug is made of stainless steel.

5. The rotatable valve assembly as set forth in claim 1 wherein the valve sleeve is made of polytetrafluoroethylene.

6. The rotatable valve assembly as set forth in claim 1 wherein the valve sleeve is made of Waukesha Metal.

7. The rotatable valve assembly as set forth in claim 3 wherein said seal means are a pair of O-rings disposed adjacent said flanges.

* * * * *